United States Patent [19]

Gerdes et al.

[11] 4,155,960
[45] May 22, 1979

[54] PORCELAIN TOWER PACKING

[75] Inventors: William H. Gerdes, Hudson; Walter W. Perkins, Copley, both of Ohio

[73] Assignee: Norton Company, Worcester, Mass.

[21] Appl. No.: 773,438

[22] Filed: Mar. 2, 1977

[51] Int. Cl.$^2$ .................. B01D 47/14; B01D 53/20
[52] U.S. Cl. ........................... 261/98; 261/DIG. 72
[58] Field of Search ............... 261/DIG. 72, 94–98; 106/73.4, 73.5

[56] References Cited

U.S. PATENT DOCUMENTS

| Re. 27,083 | 3/1971 | Klingler et al. | 106/73.4 |
|---|---|---|---|
| 2,639,909 | 5/1953 | Leva | 202/158 |
| 3,238,048 | 3/1966 | Somers | 106/73.4 |

OTHER PUBLICATIONS

Bulletin FS-1, Flexisaddles by Koch Engineering Co.
Ceramic Industry Magazine-pp. 108–111, 139; by Floyd et al. Apr. 1967.
Ceramic Age Magazine, pp. 61, 70–72, 74; by Floyd, Apr. 1966.

*Primary Examiner*—Frank W. Lutter
*Assistant Examiner*—Gregory N. Clements
*Attorney, Agent, or Firm*—Rufus M. Franklin

[57] ABSTRACT

The inclusion of 15 to 35% by weight of very fine alumina to a clay and flux containing mix for the manufacture of ceramic saddles, for use as tower packing, results in highly acid resistant packing elements.

2 Claims, 3 Drawing Figures

PORCELAIN TOWER PACKING

FIELD OF THE INVENTION

This invention relates to ceramic saddles for use as tower packing which are significantly more resistant to corrosion by acid than known prior art packings of this type.

BACKGROUND OF THE INVENTION

Prior to the present invention the conventional porcelainic tower packing material contained silica, feldspar and clay. While adequate for many applications the resistance of such ceramic to severe acid conditions is inadequate for some applications.

SUMMARY OF THE INVENTION

The present invention achieves a significant increase in the acid stability of porcelain tower packing, in particular tower packing of a saddle shape (i.e. a segment of a hollow torus as in Leva U.S. Pat. No. 2,639,909), by incorporating very finely divided alpha alumina in the mix.

The method consists of thoroughly dry mixing 15-35% calcined aluminum oxide with an average particle size of less than 3.0 microns, with 27-37% of a feldspar or feldspathic type material (such as nephylene syenite) and 28-52% clay. Water is added with mixing until a consistency suitable for extrusion or pressing is obtained. The formed bodies, after drying, are exposed to high temperature in any firing device normally used for ceramic ware. It is also understood that these body mixtures can be prepared in ways known to the ceramic art such that they could be shaped by dry forming methods as well as by wet methods. In our specific experience, the formed bodies were fired in both tunnel and periodic kilns.

BRIEF DESCRIPTION OF THE DRAWING

The drawing shows, in FIG. 1, a perspective view of a saddle packing element of the shape contemplated by this invention.

DESCRIPTION OF SPECIFIC EMBODIMENT AND COMPARISON TESTS

Figure 1:
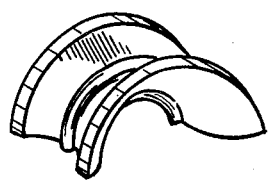
Figure 2:
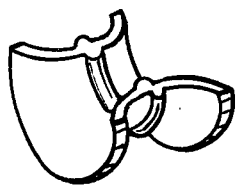
FIG. 2 is a perspective view of this saddle of FIG. 1, inverted.
Figure 3:
FIG. 3 is a cross-section of the saddle of FIG. 1.

After firing, the corrosion resistance in 72% sulfuric acid was compared to porcelain ware that did not contain deliberately added calcined alumina grains. The following table shows the weight changes obtained after six weeks of immersion in 72% sulfuric acid heated to the boiling point, using a reflux condenser to maintain a constant solution concentration. Also shown is the considerable improvement in physical strength, after firing, resulting from the deliberately added calcined alumina.

|  | Modules of Rupture $\times 10^{-3}$ psi | | % Weight Change, 72% $H_2SO_4$ at Reflux 6 weeks | |
| --- | --- | --- | --- | --- |
|  |  |  | Firing Condition[1] | Firing Condition[2] |
| Porcelain | 10.4[1] | 10.2[2] | 1.31 | 0.72 |
| Body 1 | 14.1 | 14.1 | 0.08 | 0.02 |
| Body 2 | 16.1 | 15.5 | 0.24 | 0.28 |
| Body 3 | 15.7 | 16.3 | +0.02 | +0.04 |
| Body 4 | 16.3 | 15.3 | +0.02 | +0.03 |

[1] Firing Condition 1 = 100° F./hr rise, 5 hr. soak at 2100° F.
[2] Firing Condition 2 = 100° F./hr rise, 5 hr. soak at 2200° F.

The following compositions were used in preparing the bodies shown in the previous table.

|  | Porcelain | Body 1 | Body 2 | Body 3 | Body 4 |
| --- | --- | --- | --- | --- | --- |
| % Aluminum Oxide Grain | — | 20[1] | 20[2] | 30[1] | 30[2] |
| % Flux (Nephylene Syenite A-400) | 44.2 | 29.3 | 29.3 | 34.3 | 34.3 |
| % Clay | 55.8 | 50.7 | 50.7 | 35.7 | 35.7 |

[1] Average particle size of 0.84 microns (Alcoa A-16-SG)
[2] Average particle size of 2.4 microns (Reynolds RC-662-325-mesh)

A suitable method for shaping the ceramic saddles of this invention is shown in Eckert U.S. Pat. No. 3,060,503.

Aluminas of commerce suitable for use in this invention have a mass median particle size (diameter) of less than 3 microns and a surface area of 5 to 10 square meters per gram. Preferably, the alumina should have a size of less than 1 micron (mass median diameter) and a surface area of 7 to 10 m²/g.

While the literature teaches that the addition of alumina to ceramic whiteware bodies increases the strength of such bodies, nothing in the art is known to directly suggest that such additions should improve the acid resistance of such bodies; particularly since the partial replacement of silica in glass by other metallic oxides is generally believed to make the glass more susceptible to acid attack.

What is claimed is:

1. A ceramic saddle shaped packing element which is highly resistant to acid environments made from a ceramic mix containing by weight 28 to 52% clay, 27 to 37% flux selected from the group consisting of feldspar and nepheline syenite, and from 15 to 35% by weight of particulate calcined aluminum oxide, said aluminum oxide having a mass median particle diameter of less than 3 microns and a surface area of from 5 to 10 square meters per gram.

2. A ceramic saddle packing element as in claim 1 in which the mass median particle diameter is less than 1 micron and the surface area is from 7 to 10 square meters per gram.